United States Patent [19]

Brezinski et al.

[11] Patent Number: 5,264,141
[45] Date of Patent: Nov. 23, 1993

[54] METHODS OF REDUCING PRECIPITATION FROM ACID SOLUTIONS

[75] Inventors: Michael M. Brezinski; Rick D. Gdanski, both of Duncan, Okla.

[73] Assignee: Halliburton Company, Duncan, Okla.

[21] Appl. No.: 895,316

[22] Filed: Jun. 8, 1992

[51] Int. Cl.$^5$ .............................................. E21B 43/27
[52] U.S. Cl. ................. 252/8.552; 252/8.553; 166/307
[58] Field of Search .................. 252/8.552, 8.553; 166/307

[56] References Cited

U.S. PATENT DOCUMENTS

| | | | |
|---|---|---|---|
| 3,854,959 | 12/1974 | Costain et al. | 252/390 X |
| 3,876,371 | 4/1975 | Costain et al. | 252/390 X |
| 4,633,949 | 1/1987 | Crowe | 166/279 |
| 4,888,121 | 12/1989 | Dill et al. | 252/8.553 |

FOREIGN PATENT DOCUMENTS 1449826 9/1976 United Kingdom .

*Primary Examiner*—Gary Geist
*Attorney, Agent, or Firm*—Robert A. Kent; Cliff Dougherty, Jr.

[57] ABSTRACT

Methods and compositions for reducing the precipitation of metal sulfides from acid solutions are provided. The methods basically comprise reducing the precipitation of metal sulfide compounds from an aqueous acid solution when the solution dissolves sulfide and metal ions by combining at least one oxime with the acid solution in an amount whereby the oxime preferentially reacts with sulfide ions in the solution and thereby prevents the sulfide ions from reacting with metal ions therein.

14 Claims, No Drawings

METHODS OF REDUCING PRECIPITATION FROM ACID SOLUTIONS

BACKGROUND OF THE INVENTION

1. Field of the Invention

The present invention relates to methods of reducing the precipitation of metal sulfides from acid solutions when acid treating a sour well or the like.

2. Description of the Prior Art

Acid solutions are commonly used to treat oil and/or gas wells. For example, subterranean well formations are often contacted with aqueous acid solutions to increase the permeabilities of the formations whereby the production of oil and/or gas therefrom is increased. Acid solutions are also employed to clean out perforations and tubular goods in wells as well as to clean piping and equipment.

When the well being treated is sour, i.e., the fluids produced contain a significant quantity of sulfide compounds, and particularly hydrogen sulfide, problems are often encountered as a result of the precipitation of iron sulfide from the acid treating solution. That is, dissolved sulfide ions and dissolved ferrous ions from ferrous sulfide scale and/or the subterranean formation being treated react to form ferrous sulfide in the acid solution. The ferrous sulfide precipitates from the acid solution when the pH of the solution reaches a level greater than about 1.9. The pH value of spent acid solution used to treat subterranean well formations is greater than 1.9, and therefore, ferrous sulfide dissolved in an unspent acid solution precipitates at some point before becoming spent. The ferrous sulfide precipitate can plug the treated formation and cause serious damage to the well.

Attempts have been made to reduce the precipitation of ferrous sulfide by maintaining the pH of the acid solution below 1.9. However, such attempts have generally failed as a result of the pH rising to above 1.9 at some point in the acidizing procedure.

While iron-containing scale dissolved in an acid solution can be in the ferric [Fe (III)] oxidation state in producing wells whereby ferric hydroxide ($FeOH_3$) precipitates, such ferric scale is generally not present in hydrogen sulfide producing wells. That is, a well which contains hydrogen sulfide does not contain exposed ferric scale because the hydrogen sulfide rapidly converts such scale to ferrous sulfide scale.

A method and composition for preventing the precipitation of ferrous sulfide and sulfur when acidizing a sour well are disclosed in U.S. Pat. No. 4,633,949 issued on Jan. 6, 1987. In accordance with that disclosure, an iron complexing agent such as ethylenediaminetetraacetic acid (EDTA) and an iron reducing agent such as erythorbic acid are added to the acidizing solution used. The iron complexing agent is intended to stabilize ferrous ion in solution in order to inhibit precipitation of ferrous sulfide, and the iron reducing agent is intended to reduce ferric ion to ferrous ion in order to inhibit the formation of elemental sulfur. Thus, the invention disclosed attempts to control precipitation of both elemental sulfur and ferrous sulfide by complexing ferrous ion and reducing ferric ion to ferrous ion.

U.S. Pat. No. 4,888,121 issued on Dec. 19, 1989 also discloses compositions and methods for controlling precipitation when acidizing sour wells. In accordance with that disclosure, an iron sequestering agent such as an aminopolycarboxylic acid is added to the acid treating solution to sequester dissolved iron therein and a sulfide modifier such as acetal is added to combine with dissolved sulfides. The combination of iron sequestering agent and sulfide modifier functions to inhibit or reduce the precipitation of ferric hydroxide, ferrous sulfide and free sulfur from the acid solution.

While the prior art methods have achieved varying degrees of success in preventing precipitation of metal sulfides from acid treating solutions, there is still a need for improved sour well acidizing methods and compositions which are relatively inexpensive to perform and use and produce little or no precipitate.

SUMMARY OF THE INVENTION

The present invention meets the need described above and overcomes the shortcomings of the prior art by providing improved methods and compositions for reducing precipitation when acidizing sour wells and the like. The methods of the invention reduce the precipitation of metal sulfide compounds from an aqueous acid solution when the solution dissolves sulfide and metal compounds by providing at least one oxime in the acid solution. That is, at least one oxime of the formula R—CH=N—OH wherein R represents an alkyl radical having from 1 to about 7 carbon atoms or a phenyl radical is combined with the solution in an amount whereby it preferentially reacts with sulfide ions in the solution and thereby prevents the sulfide ions from reacting with metal ions therein.

The compositions of the invention are basically comprised of water, an acid selected from the group consisting of inorganic acids, organic acids and mixtures thereof and at least one oxime of the type described above in an amount effective to preferentially react with sulfide ions when they are dissolved in the acid composition thereby preventing the dissolved sulfide ions from reacting with dissolved metal ions and precipitating.

It is, therefore, a general object of the present invention to provide improved methods and compositions for reducing precipitation when acidizing sour wells.

Other and further objects, features and advantages of the present invention will be readily apparent to those skilled in the art upon a reading of the description of preferred embodiments which follow.

DESCRIPTION OF PREFERRED EMBODIMENTS

The present invention provides aqueous acid compositions and methods of reducing the precipitation of metal sulfide compounds when acid compositions are used to dissolve sulfide and metal ions. The methods and compositions are particularly suitable for reducing the precipitation of metal sulfide compounds in the acid treatment of sour wells.

The term "sour well" is used herein to mean oil and/or gas wells containing sulfide compounds, and particularly hydrogen sulfide. When such wells are treated with acid solutions to stimulate the production of oil and/or gas therefrom, the acid solutions dissolve sulfide ions and metal ions such as iron, zinc and lead. The metal and sulfide ions react and when the pH of the solution reaches a level of about 1.9 and higher, the metal sulfides precipitate from solution. Metal sulfide precipitate can plug the treated formation or otherwise cause serious damage to wells and associated production equipment.

In accordance with the methods of the present invention, at least one compound which functions as a clean and efficient sulfide scavenger, namely, an oxime having the formula R—CH=N—OH wherein R represents an alkyl radical having from 1 to about 7 carbon atoms or a phenyl radical, is combined with an acid solution in an amount whereby when the acid solution contains sulfide ions and metal ions, the sulfide ions are prevented from reacting with the metal ions. That is, the oxime preferentially reacts with sulfide ions in the acid solution and thereby prevents the sulfide ions from reacting with metal ions therein. The most preferred oxime for use in accordance with this invention is acetaldoxime ($CH_3$—CH=N—OH).

The oxime sulfide scavenging additive can be used in various acid solutions containing inorganic acids, organic acids or mixtures of such acids. Examples of inorganic acids with which the additive can be used include hydrochloric acid, hydrofluoric acid and fluoboric acid. Examples of organic acids are formic acid, acetic acid, citric acid, lactic acid, thioglycolic acid and glycolic acid. Generally, the acid solutions utilized for stimulating the production of oil and/or gas from subterranean well formations are aqueous acid solutions of predominately inorganic acids, e.g., aqueous acid solutions containing inorganic acid in an amount in the range of from about 5% to about 30% of inorganic acid by weight of the water and inorganic acid making up the solution. Preferably, the acid solution in which the sulfide scavenging additive of this invention is dispersed or dissolved comprises a major amount of inorganic acid, e.g., hydrochloric acid, and a minor amount of an organic acid, e.g., glycolic acid. The organic acid is preferably included in the acid solution in an amount sufficient to retard the initial pH rise of the solution as it dissolves sulfide and metal ions. Such an amount is generally in the range of from about 0.5% to about 20% of organic acid by weight of the resulting solution containing water, inorganic acid and organic acid. The delay allows time for the sulfide scavenging additive to preferentially react with all of the sulfide ion present prior to when the pH level of the acid solution reaches about 1.9.

The oxime additive is preferably admixed with an acid solution prior to when the acid solution dissolves sulfide and metal compounds, e.g., prior to introducing the acid solution into a subterranean well formation to be stimulated or into structure to be cleaned. Alternatively, the oxime additive can be admixed with the acid solution on-the-fly, i.e., as the acid solution is pumped into a well bore or other location. If mixed in-situ, it is important that the oxime additive be dispersed or dissolved in the acid solution before the acid solution spends to any great extent since the additive only reacts with sulfides in the presence of a strong acid solution. For purposes of this invention, a strong acid solution is one having a pH of less than or equal to about 1.

The amount of the oxime additive combined with an acid solution should be that amount which is at least sufficient to prevent precipitation of metal sulfides from the solution during and after the acid spends. In most applications including acid treatments of sour subterranean well formations, the amount of oxime(s) employed is an amount in the range of from about 0.05% to about 20% of oxime(s) by weight of the acid solution and oxime(s). Most preferably, the oxime(s) is added to an acid solution in an amount in the range of from about 2.0% to about 10.0% of oxime(s) by weight of the acid solution and oxime(s).

Although the methods and compositions of this invention are particularly useful for performing stimulation acid treatments in sour wells, they can be utilized in a variety of other applications. For example, the methods and compositions can be used in operations for removing ferrous and non-ferrous metal sulfide scales from the internal surfaces of industrial equipment such as feed water heaters, steam boilers and the like. The oxime sulfide scavenging additive functions in an acid solution used to clean the surfaces of equipment in the same way that it functions in an acid solution used to treat a sour well, i.e., it preferentially reacts with sulfide ions in the acid solution and thereby prevents the sulfide ions from reacting with metal ions therein and subsequently precipitating.

The methods of the present invention basically comprise combining at least one oxime of the formula R—CH=N—OH wherein R is an alkyl radical having from 1 to about 7 carbon atoms or a phenyl radical, most preferably acetaldoxime, with the acid solution used in an amount whereby the oxime preferentially reacts with sulfide ions dissolved in the acid solution and thereby prevents their reaction with metal ions dissolved therein. In sour well treatments, as the acid composition dissolves sulfide ions and metal ions from metal sulfide scale deposits and the formation being treated, the oxime preferentially reacts with the sulfide ions in the acid solution and prevents the sulfide ions from reacting with metal ions. This in turn prevents the precipitation of metal sulfides such as ferrous sulfide, zinc sulfide and lead sulfide from the acid composition as it spends and the pH level thereof increases.

The compositions of the present invention for dissolving metal and sulfide compounds with a minimum of metal sulfide precipitation are comprised of water, an acid selected from the group consisting of inorganic acids, organic acids and mixtures thereof and at least one oxime of the formula R—CH=N—OH wherein R represents an alkyl radical having from 1 to about 7 carbon atoms or a phenyl radical present in the composition in an amount sufficient to preferentially react with sulfide ions dissolved in the composition and thereby prevent such sulfide ions from reacting with metal ions dissolved therein.

While the compositions can be comprised of any of the various inorganic and organic acids mentioned above, they are preferably comprised of a major amount of inorganic acid and a minor amount of organic acid, e.g., inorganic acid in an amount in the range of from about 5% to about 30% by weight of water and inorganic acid in the compositions and organic acid in an amount in the range of from about 0.5% to about 20% by weight of water, inorganic acid and organic acid in the compositions.

The sulfide scavenging oxime additive is present in the compositions in an amount in the range of from about 0.05% to about 20% of oxime additive by weight of the compositions, most preferably in an amount in the range of from about 2% to about 10% by weight of the compositions.

A typical aqueous acid composition of this invention for acid treating a sour well is comprised of water, an inorganic acid, e.g., hydrochloric acid, present in the composition in an amount in the range of from about 5% to about 30% by weight of water and inorganic acid in the composition; an organic acid, e.g., glycolic acid, present in the composition in an amount in the range of from about 0.5% to about 20% by weight of water, inorganic acid and organic acid in the composition; and at least one oxime, preferably acetaldoxime, present in the composition in an amount in the range of from about 0.05% to about 20% by weight of the composition.

Other components can be included in the acid compositions of the present invention including, but not limited to, corrosion inhibitors, pH control additives, fluid loss additives, non-emulsifying agents, oxygen scavengers, mutual solvents and surface active agents. Depending upon the particular application, one or more of these additional components can be used to enhance the degree of precipitation control achieved. Oxygen scavengers can be used to reduce the amount of oxygen present in the acid solution to inhibit formation of ferric iron by oxidation of ferrous iron. Compounds such as erythorbic acid and hydroxylamine complexes serve as oxygen scavengers.

In order to further illustrate the methods and compositions of the present invention, the following examples are provided.

EXAMPLE 1

Tests were conducted to determine the ability of acetaldoxime to inhibit the formation of ferrous sulfide precipitate in the presence of live acid and in the absence of air. The tests were conducted under high pressure, high temperature, anaerobic conditions in a see-through cell in accordance with the following procedure.

Standard 15% by weight acid solutions were prepared with reagent grade hydrochloric acid and deionized water prior to preparing the solutions, the deionized water was deoxygenated by purging it with nitrogen gas for about 2 hours.

Ferrous iron (II) solutions were prepared with deoxygenated water and anhydrous ferrous chloride. The anhydrous ferrous chloride was weighed in a glove bag and loaded into a Schlenk tube. Water was added by way of a syringe or pipette. The resulting solution was stored in a Schlenk tube and kept under nitrogen at all times.

A see-through cell was charged with Icelandic Spar (calcium carbonate) and preheated to 200° F. The cell was then pressurized with nitrogen and vented five times to remove oxygen. The cell was then pressurized to 200 psi with nitrogen, and a pressure addition funnel previously purged to remove oxygen was connected to the cell and purged by opening the valve of the cell and bleeding nitrogen through the funnel. After purging, the funnel was capped with a rubber septum until used.

A reaction mixture was prepared by pouring the required quantity of 15% hydrochloric acid solution into a Schlenk tube which had been evacuated and backfilled with nitrogen gas. A teflon coated magnetic stir bar was added and the vessel was capped. The tube was immersed in an ice bath and allowed to cool for 10 minutes and then subjected to dynamic vacuum for 15 minutes to remove all dissolved oxygen from the solution. The tube was then backfilled with nitrogen and opened with a vigorous flow of nitrogen being maintained at all times. A pipette was thoroughly flushed with nitrogen and used to transfer an aliquot of concentrated ferrous chloride solution into the tube. A source of sulfide ions and acetaldoxime were added to the tube and the resulting reaction mixture was stirred until homogenous. The reaction mixture was then injected into the see-through cell containing Icelandic Spar and the cell pressure was quickly raised to 500 psi. When the reaction was complete and the acid spent, the results were observed. The test described above was conducted four times utilizing various amounts of acetaldoxime in the reaction mixture. The observed results are set forth in Table I below.

TABLE I

| Test No. | Amount of Acetaldoxime Used, % by Weight in Reaction Mixture[1] | Amount[2] of Ferrous Sulfide Precipitate Formed |
|---|---|---|
| 1 | 0.6 | L |
| 2 | 1.2 | L |
| 3 | 2.5 | M |
| 4 | 4.7 | S |

[1]Reaction Mixture Conditions: 15% HCl; 5000 mpl Ferrous ion; an equivalent amount of sulfide ion; 500 psig; 200° F.
[2]L = Large amount; M = Moderate amount; S = Small (minute) amount As can be seen from the results set forth in Table I, an acetaldoxime concentration of 4.7% by weight in the reaction mixture was required to reduce the precipitation of ferrous sulfide to a minute amount. The existence of the minute amount of precipitate suggested that the acid spent very quickly to a pH level of about 1.9 or above whereby some precipitation of iron sulfide occurred prior to when the sulfide was completely preferentially reacted with the acetaldoxime. To retard the rapid rise in pH of the acid, an organic acid, i.e., glycolic acid, was added to two reaction mixtures in various amounts. The reaction mixtures contained acetaldoxime in an amount of 2.5% by weight of the mixtures, all other components in the mixtures being the same as described above. The results of these tests are set forth in Table II below.

TABLE II

| Test No. | Amount of Acetaldoxime, % by weight in Reaction Mixture[1] | Amount of Glycolic Acid, % by weight in Reaction Mixture | Amount of Fe(II)S Precipitate |
|---|---|---|---|
| 1 | 2.5 | 7.5 | None |
| 2 | 2.5 | 2.5 | None |

[1]Reaction Mixture Conditions: 15% HCl; 5000 mpl Ferrous ion; an equivalent amount of sulfide ion; 500 psig; 200° F.

From Table II it can be seen that the presence of a minor amount of organic acid in the reaction mixture containing 15% by weight hydrochloric acid and acetaldoxime in an amount of 2.5% by weight in the reaction mixture prevented ferrous sulfide precipitation.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the precipitation of metal sulfide compounds from an acid solution when said acid solution contains dissolved sulfide and metal ions comprising reacting at least one oxime of the formula R—CH=N—OH wherein R is an alkyl radical having from 1 to about 7 carbon atoms or a phenyl radical contained in said acid solution with said dissolved sulfide ions in said acid solution to thereby prevent said sulfide ions from reacting with dissolved metal ions therein.

2. The method of claim 1 wherein said oxime is present in said acid solution in an amount in the range of from about 0.05% to about 20% by weight of said acid solution and oxime.

3. The method of claim 1 wherein said acid is selected from inorganic acids, organic acids and mixtures thereof.

4. The method of claim 1 wherein said acid comprises an inorganic acid.

5. The method of claim 4 which further comprises the step of including an organic acid in said acid solution in an amount in the range of from about 2.5% to about 20% by weight of water, inorganic acid and organic acid in said solution.

6. The method of claim 5 wherein said organic acid is selected from the group consisting of formic acid, acetic acid, citric acid, lactic acid, thioglycolic acid and glycolic acid.

7. The method of claim 5 wherein said organic acid is glycolic acid.

8. A method of reducing the precipitation of metal sulfide compounds from an aqueous acid solution used for acid treating a sour well when said acid solution contains dissolved sulfide and metal ions comprising reacting acetaldoxime contained in said acid solution with said dissolved sulfide ions in said solution to thereby prevent said sulfide ions from reacting with dissolved metal ions therein.

9. The method of claim 8 wherein said acetaldoxime is present in said acid solution in an amount in the range of from about 0.05% to about 20.0% by weight of said acid solution and acetaldoxime.

10. The method of claim 9 wherein said acid is selected from inorganic acids, organic acids and mixtures thereof.

11. The method of claim 9 wherein said acid comprises an inorganic acid selected from the group consisting of hydrochloric acid, hydrofluoric acid, fluoboric acid and mixtures thereof present in said aqueous acid solution in an amount in the range of from about 5% to about 30% by weight of water and inorganic acid in said solution.

12. The method of claim 11 which further comprises the step of including an organic acid in said acid solution in an amount in the range of from about 2.5% to about 20% by weight of water, inorganic acid and organic acid in said solution.

13. The method of claim 12 wherein said organic acid is selected from the group consisting of formic acid, acetic acid, citric acid, lactic acid, thioglycolic acid and glycolic acid.

14. The method of claim 12 wherein said organic acid is glycolic acid.

* * * * *